United States Patent [19]

Gottlieb

[11] 4,026,583
[45] May 31, 1977

[54] STAINLESS STEEL LINER IN OIL WELL PIPE

[75] Inventor: Theodore Gottlieb, Los Angeles, Calif.

[73] Assignee: Hydril Company, Los Angeles, Calif.

[22] Filed: Apr. 28, 1975

[21] Appl. No.: 572,079

[52] U.S. Cl. .................. 285/55; 29/421 E; 228/107; 228/126; 228/193; 285/332.2; 285/334; 285/382.4

[51] Int. Cl.² .................. F16L 9/14; E21B 17/08

[58] Field of Search .......... 285/55, 382.4, 382.5, 285/381, 334, 332.2; 29/421 E, 421; 228/107, 108, 109, 193, 126

[56] References Cited

UNITED STATES PATENTS

| | | | |
|---|---|---|---|
| 2,678,224 | 5/1954 | Kooistra | 285/55 |
| 2,779,279 | 1/1957 | Maiwurm | 285/382.5 |
| 2,919,936 | 1/1960 | Hurley | 285/55 |
| 2,938,562 | 5/1960 | Watts et al. | 285/55 X |
| 3,025,596 | 3/1962 | Ward et al. | 29/421 E X |
| 3,064,344 | 11/1962 | Arne | 29/421 |
| 3,140,537 | 7/1964 | Popoff | 29/421 E X |
| 3,156,042 | 11/1964 | Reed | 228/126 |
| 3,186,738 | 6/1965 | Dalrymple | 285/55 |
| 3,307,860 | 3/1967 | Blount et al. | 285/55 |
| 3,336,054 | 8/1967 | Blount et al. | 285/55 |
| 3,489,437 | 1/1970 | Duret | 285/55 |
| 3,508,766 | 4/1970 | Kessler et al. | 285/55 X |
| 3,535,767 | 10/1970 | Doherty, Jr. et al. | 29/421 E X |
| 3,562,887 | 2/1971 | Schroeder et al. | 29/421 E X |
| 3,872,573 | 3/1975 | Nichols et al. | 285/381 X |

*Primary Examiner*—Thomas F. Callaghan
*Attorney, Agent, or Firm*—William W. Haefliger

[57] ABSTRACT

An oil well pipe incorporates a corrosion-resistant, metallic liner which is intimately metallurgically bonded to the pipe bore.

5 Claims, 8 Drawing Figures

STAINLESS STEEL LINER IN OIL WELL PIPE

BACKGROUND OF THE INVENTION

This invention relates generally to prevention of corrosion in well equipment, and more particularly concerns providing well pipe, casing and tubing with corrosion resistant liners which also protect made-up pipe joints.

Oil and gas well pipe, tubing and casing normally consist of relatively low cost, low carbon steel susceptible to hydrogen embrittlement, hydrogen sulfide induced corrosion, and chloride stress corrosion and cracking. While efforts have in the past been made to overcome such problems, they have not met with wide acceptance. For example, while the entire pipe, tubing or casing string may be formed from stainless steel, this is a far too costly solution. Also, while stainless steel liners have been proposed, it is found that hydrogen diffusing into the clearances between the liner and pipe bore causes problems such as hydrogen embrittlement, and deformation of the liner when the hydrogen expands. Further, lining of pipe joints was difficult to achieve and generally unsatisfactory, and plastic linings are subject to local damage such as gouging caused by travel of well tools in the pipe, tubing or casing.

SUMMARY OF THE INVENTION

It is a major object of the invention to provide a damage resistant, corrosion resistant lining for well pipe, tubing and casing bores, and joints, overcoming the above described as well as other problems peculiar to this environment. In this regard, the invention provides a continuous, corrosion and gouge resistant, metallic barrier for oil well tubular goods, which does not permit hydrogen entrapment or collection between the liner and bore of the pipe, tubing or casing.

Basically, the invention is embodied in the combination, with oil well pipe having a bore, of a. a corrosion-resistant, metallic liner within the pipe, and b. a metallurgical bond intimately joining the liner to the pipe bore.

As will be seen, a braze bond or diffusion bond may be employed; and the liner comprises a thin stainless steel cylinder preferably having a bonding metallic layer on the cylinder outer surface; the assembled pipe typically includes sections having pin and box members forming a made-up joint, and in one form of the invention the liner includes sections lining the pipe sections and having terminals which overlap proximate the joint. Such overlapping liner terminals may themselves form a smaller pin and box joint having taper interfit which may be advantageously sealed off, as will be explained.

In anothr form of the invention, the pipe pin and box members may themselves consist of corrosion resistant material such as stainless steel, and are joined as by welding to the low carbon steel pipe at its opposite ends. The corrosion resistant liner then is formed to overlap the joints between pin and box members and the pipe, and is bonded not only to the pipe bore but also to the bores of the pin and box members.

In its method aspects, the invention basically involves the steps that include:

a. locating the liner within the pipe bore, and b. forming a metallurgical bond intimately joining the liner to the pipe bore.

As mentioned, the bond formation step may be effected by brazing the liner to the pipe bore, at liner temperature of around 1,000° F, for example, or by pressurally expanding the liner (or portions thereof) against the pipe bore, as by explosion forming or liquid pressure expansion techniques. Vacuum is applied during the bond formation to prevent air entrapment between the liner and box; and corrosion resistant pin and box members may be preliminarily jointed to opposite ends of the pipe.

These and other objects and advantages of the invention, as well as the details of an illustrative embodiment, will be more fully understood from the following description and drawings, in which:

DRAWING DESCRIPTION

DETAILED DESCRIPTION

Figure 1:
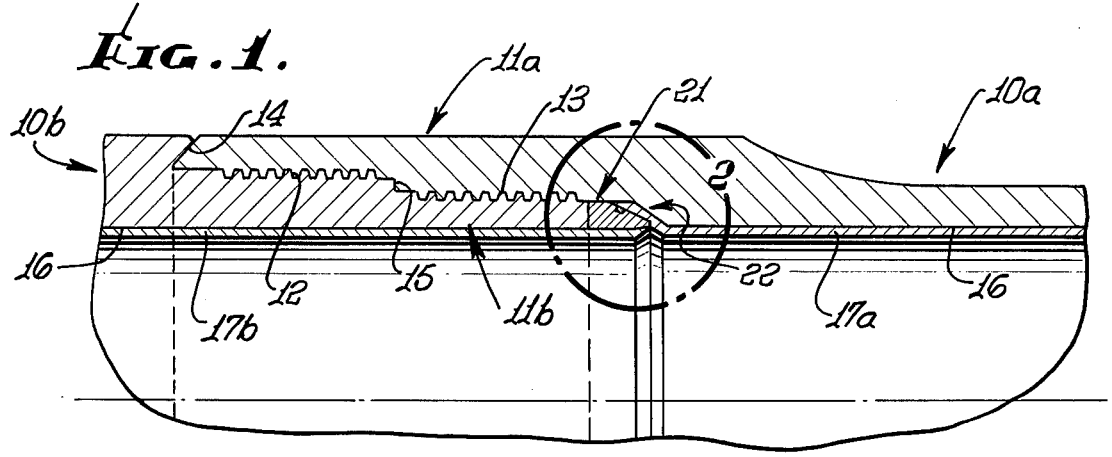
FIG. 1 is an elevation showing joint connected well pipe sections containing liners.
Figure 2:
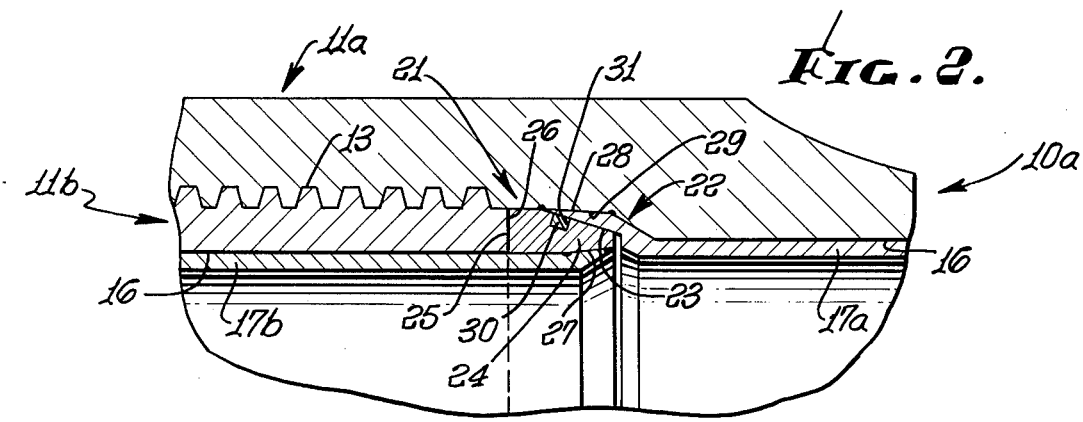
FIG. 2 is an enlarged view of the FIG. 1 joint, taken on lines 2—2 of FIG. 1.

Referring first to FIGS. 1 and 2 steel oil or gas well tubing pipe or casing sections are represented at 10a and 10b, the former provided with a box 11a and the latter with a pin 11b, made-up as shown. For descriptive purposes, all such tubular goods will be referred to as pipe. A two-step threaded make-up is illustrated at 12 and 13, there being metal-to-metal annular seals formed at the locations 14 and 15. A similar threaded connection is shown in U.S. Pat. No. 3,532,632 to MacArthur. Such oil well pipe typically consists of a low carbon steel, which is not substantially corrosion resistant.

In accordance with one important aspect of the invention, a corrosion resistant metallic liner is metallurgically bonded to the bore 16 of each pipe section, the bond typically being a diffusion bond or a braze bond and characterized in that there is intimate intermolecular metallurgical interconnection between the liner and bore. As is clear from FIG. 1, relatively thin, cylindrical, corrosion resistant, stainless steel liner sections 17a and 17b extend lengthwise throughout the lengths of the pipe sections, thereby to provide a continuous corrosion resistant barrier.

Figure 5:
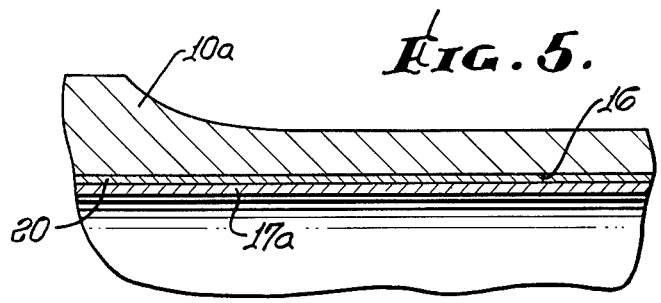
FIG. 5 is an elevation showing a portion of yet another modified well pipe section, which has been lined.

Various liner compositions may be employed depending upon the "aggressiveness" of the contained fluid. For example, high alloy materials such as Hastelloy C, Inconel 625, MP35N may be used for extremely aggressive "sour" ($H_2S$) environments, whereas lesser alloy containing steels such as 26 Cr- 1Mo, 28 Cr-4Mo, 17-4PH, Carpenter 450 can be used for less aggressive "sweet" environments (Chlorides and wet $CO_2$ in the oil or gas). The liner radial thickness is preferably between 0.005 and 0.100 inch, thinner liners being too fragile and thicker liners being too expensive. The bond may be a braze bond, as for example may be achieved by heating of the liner to brazing temperatures, and in this case the liner outer surface should have a liquifying temperature substantially lower than that of the steel pipe section. In one example, the stainless steel liner may include a metallic outer coating such as copper satisfying this lower liquifying temperature condition, FIG. 5 showing such a coating 20 on the stainless steel liner 17a and braze bonded to the bore 16 of the steel well pipe 10a.

In another example, the bond may alternatively be achieved by internally pressurizing the liner to cause it to weld to the pipe bore, the liner metal diffusing into the bore metal. Such pressure may be created by an explosion within the liner or by pressurizing liquid contained within the liner; as will be seen. Again, a thin coating or film (such as copper) on the surface of the liner aids the metallurgical diffusion bond formation. Such a film not only aids bond formation, but it also serves to lower the partial pressure of hydrogen which under certain conditions may diffuse through the liner material from the oil or gas within the pipe. As the partial pressure of hydrogen is reduced, the embrittlement effects on the outer steel pipe are decreased. Also, continuous bonding of the liner to the pipe body is essential to the prevention of liner collapse which might otherwise be caused by expansion of hydrogen gas that has diffused through the liner and into any spaces between the liner and the pipe bore. Such spaces are eliminated by the bonding process. Also, any microscopic peaks and valleys on the outer surface of the liner tend to penetrate the plating layer and deflect same to enhance molecular interlocking with the pipe bore.

Returning to FIGS. 1 and 2, the liner sections typically have overlapping terminals proximate the pipe section pin and box joint. In the example, the liner terminals form pin and box portions as at 21 and 22 having tapering interfit as at 23, within the pipe box member 11a. Further, the liner pin section 21 may include an annular nose 24 whose inner and outer surfaces are relatively forwardly tapered. The rear face 25 of nose 24 is welded (as by friction welding, for example) to the front end face 26 of the pipe pin section 11b, and the inner surface 27 of the nose is welded (as by explosion welding) to the outer surface of the cylindrical liner 17b. The liner box section 22 has an outer annular surface 28 which is welded (as by explosion welding) to the inner surface 29 of the pipe box section 11a. A non-metallic annular seal 30 carried in an annular groove 31 in the nose 24 seals off between the tapered interfitting surfaces at 23 between the liner box and pin sections; for example, the seal may consist of polytetrafluoroethylene material, as for example TEFLON or VITON, and may comprise an O-ring having a radial thickness of between 0.025 and 0.225 inches. The nose 24 may consist of stainless steel as described above, i.e. of the same material as the liner sections 17a and 17b.

Figure 3:
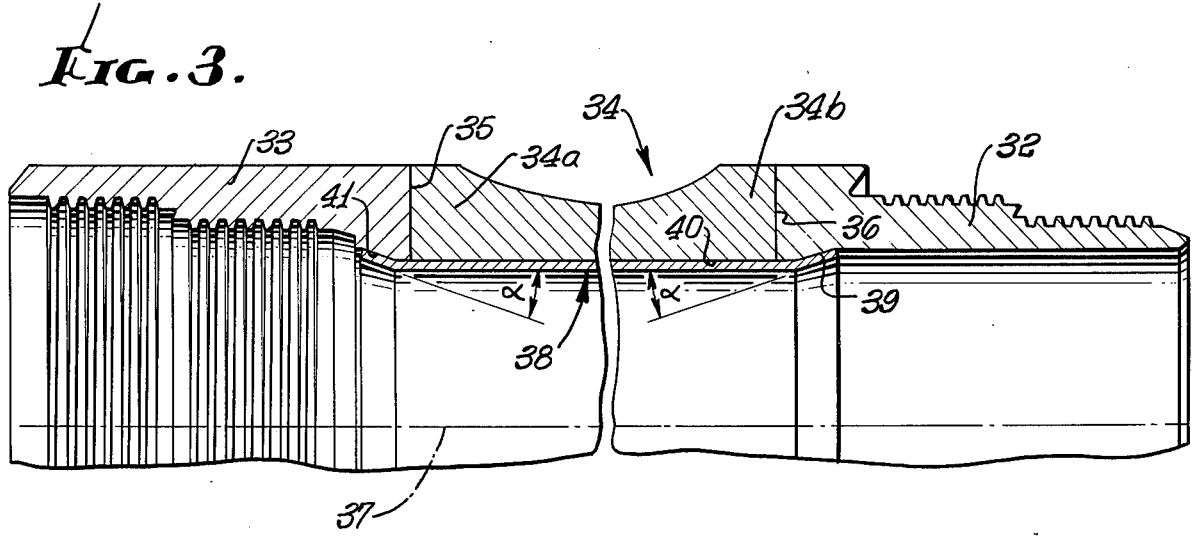
FIG. 3 is an elevation showing a modified well pipe section which has been lined.
Figure 4:
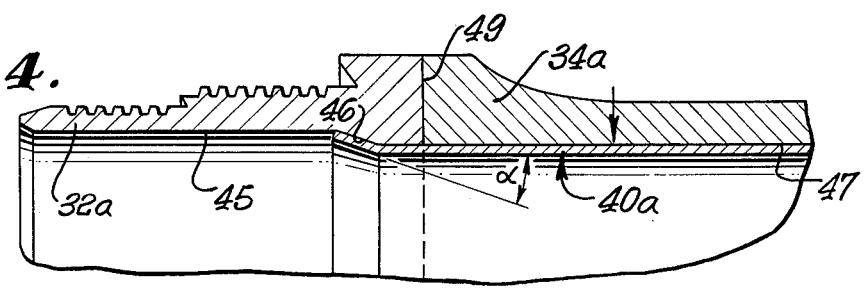
FIG. 4 is an elevation showing a portion of a further modified well pipe section, which has been lined.

Referring to FIGS. 3 and 4, annular end portions (such as two-step threaded pin and box members 32 and 33, for example) of the pipe section 34 may themselves consist of corrosion resistant material, such as one of the stainless steels described above. The members 32 and 33 are typically friction weld connected to the pipe end extents 34a and 34b at joints 35 and 36 which extend in planes normal to the pipe axis 37. Further, the liner 38, (which corresponds to the liner 17 discussed above with respect to FIGS. 1, 2 and 5) bridges the joints 35 and 36, as shown; accordingly, the liner is bonded to the bores 39, 40 and 41 of the pin 32, box 33 and pipe 34, and the opposite ends of the liner taper at an angle $\alpha$ between 4° and 15°.

In FIG. 4, the corrosion resistant pin 32a which corresponds to pin 32 in FIG. 3, has a bore 45 and counterbore 46. The corrosion resistant liner 40a, which corresponds to liner 38 in FIG. 3, is bonded to the counterbore 46 and also to the bore 47 of the pipe 34a (which is relatively non-corrosion resistant). Note that the liner bridges the welded joint 49 between the pin 32a and the pipe.

The method of producing the corrosion resistant assembly basically includes the following steps:
 a. locating the liner within the pipe bore, and
 b. forming a metallurgical bond intimately joining the liner to the pipe bore.

Figure 6:
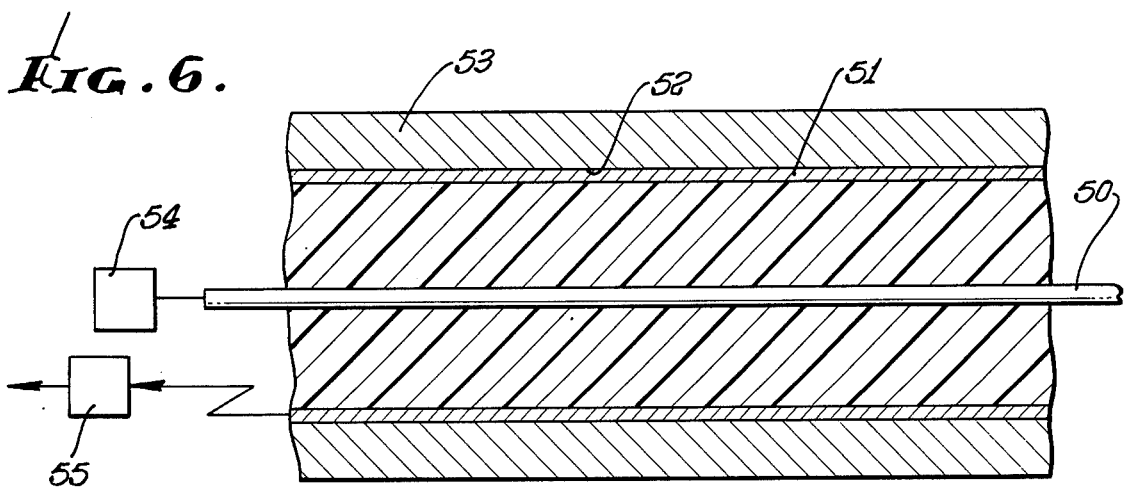
FIGS. 6 and 6a are elevations showing methods of welding a liner to a well pipe bore.
Figure 6A:
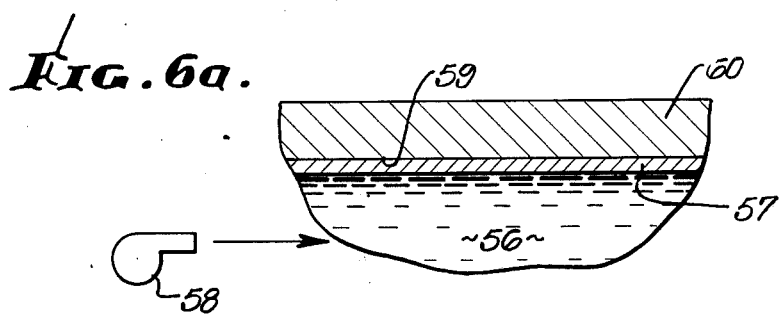

As discussed above, the bond formation may be effected by pressurally expanding the liner against the pipe bore, under high vacuum conditions to ensure that no air will be trapped at the interface between the liner and the pipe bore. FIG. 6 shows an explosive string charge 50 at the axis of the pipe, with material such as plastic (polyurethane, for example) filling the space between the charge and the liner 51. In this regard, the liner may be supported on the carrier plastic. Upon detonation of the charge, high pressure is transmitted via the plastic material to the liner, expanding it against the bore 52 of the pipe 53. The liner may typically include a thin plated exterior layer as discussed in connection with FIG. 5. A detonator for the string charge appears at 54, and air evacuation equipment at 55, the pipe being suitably end-capped or otherwise enclosed to permit the evacuation. FIG. 6a shows liquid 56 filling the interior of liner 57, and pressurized by a pump 58 to expand the liner against the bore 59 of pipe 60.

Figure 7:
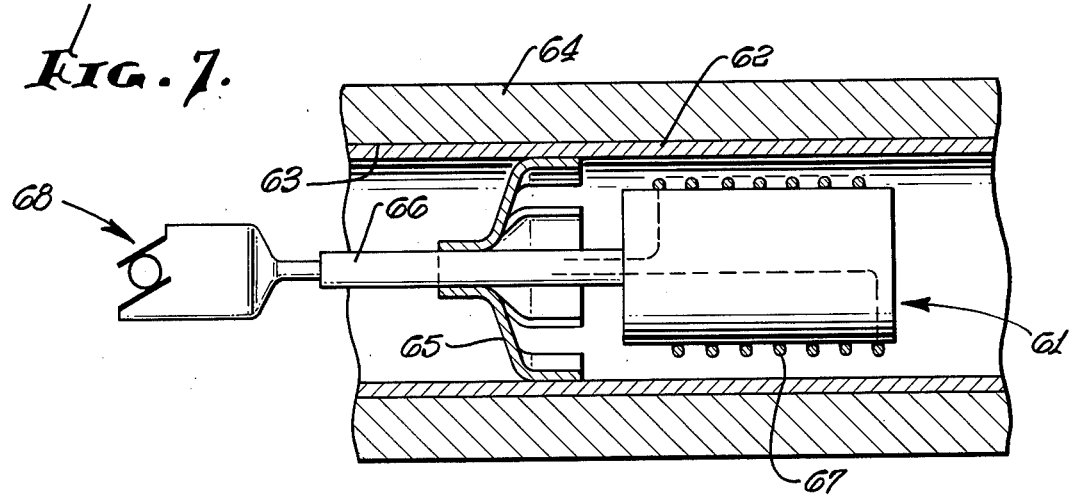
FIG. 7 is an elevation showing a high temperature bond enhancement method.

FIG. 7 illustrates a braze bonding procedure, employing high temperature probe 61 advanced axially within the pipe to heat the liner 62 to brazing temperature, whereby a bond may be effected between the liner and the bore 63 of pipe 64. Probe centering fingers 65 attached to mounting shaft 66 serve to center the probe as it is axially advanced. The probe may heat the liner by electromagnetic induction, and coil 67 is shown as energized by AC source 68, for this purpose.

Prior to bonding, the pipe bore and liner outer surface are cleaned, as by abrasive blasting or knurling and dipping in hydrochloric acid or ammonium hydride acid. Other bonding materials as indicated at 20 in FIG. 5 include silver base solders, aluminum, lead and indium base solders, and the thickness of the layer 20 preferably lies between 0.0005 and 0.005 inches.

I claim:
1. In combination with steel oil well pipe having a bore defining an axis
 a. a corrosion-resistant, metallic liner within the pipe, and
 b. a metallurgical bond intimately joining the liner to the pipe bore, said bond characterized by an intimate intermolecular diffusion connection extending circumferentially continuously along substantially the entire axial length between the liner and the pipe bore for preventing formation and collection at the bond location along the bore of gaseous hydrogen resulting from diffusion through the bond of atomic hydrogen,
 c. the major length of the pipe consisting of steel which is relatively non-corrosion resistant, and the pipe also including an annular end portion the surface of which is corrosion resistant, said end portion being threaded and having a bore, said liner bonded to the bore of the pipe major length and also to annular bore extent of said pipe end portion, said end portion welded endwise to said major length of the pipe at an annular joint therebetween, said liner bridging said joint, said annular bore extent being axially tapered between 4° and 15° relative to the bore axis, d. said annular bore extent located between said joint and an interior zone of the pipe end portion radially inwardly of said threading, the liner and said axial bore extent terminating proximate said joint, the joint extending substantially radially between the liner and the outer surface of said end portion, e. said liner comprising a corrosion resistant steel cylinder and a metallic film on the cylinder outer surface, the bond formed between said film and the pipe bore.

2. The combination of claim 1 wherein said bond consists of a braze bond.

3. The combination of claim 1 wherein said bond consists of a diffusion bond.

4. The combination of claim 1 wherein said end portion consists of an interiorly threaded box.

5. The combination of claim 1 wherein said end portion consists of an exteriorly threaded pin.

* * * * *